US009896377B2

(12) United States Patent
Mahieu et al.

(10) Patent No.: US 9,896,377 B2
(45) Date of Patent: Feb. 20, 2018

(54) LOW-EMISSIVITY AND ANTI-SOLAR GLAZING

(71) Applicant: AGC GLASS EUROPE, Louvain-la-Neuve (BE)

(72) Inventors: Stijn Mahieu, Lovendegem (BE); Anne-Christine Baudouin, Louvain-la-Neuve (BE); Marc Hauptmann, Kessel-Lo (BE); Jean-Michel Depauw, Brussels (BE)

(73) Assignee: AGC GLASS EUROPE, Louvain-la-Nueve (BE)

( * ) Notice: Subject to any disclaimer, the term of this patent is extended or adjusted under 35 U.S.C. 154(b) by 0 days.

(21) Appl. No.: 14/894,466

(22) PCT Filed: May 28, 2014

(86) PCT No.: PCT/EP2014/061096
§ 371 (c)(1),
(2) Date: Nov. 27, 2015

(87) PCT Pub. No.: WO2014/191474
PCT Pub. Date: Dec. 4, 2014

(65) Prior Publication Data
US 2016/0122237 A1    May 5, 2016

(30) Foreign Application Priority Data

May 30, 2013   (BE) .................................. 2013/0385
Dec. 13, 2013  (EP) ..................................... 13197207

(51) Int. Cl.
C03C 17/36   (2006.01)
G02B 1/14    (2015.01)
G02B 5/20    (2006.01)
G02B 5/26    (2006.01)

(52) U.S. Cl.
CPC ........ *C03C 17/366* (2013.01); *C03C 17/3618* (2013.01); *C03C 17/3626* (2013.01); *C03C 17/3639* (2013.01); *C03C 17/3644* (2013.01); *C03C 17/3681* (2013.01); *G02B 1/14* (2015.01); *G02B 5/208* (2013.01); *G02B 5/26* (2013.01); *C03C 2217/70* (2013.01); *C03C 2218/156* (2013.01)

(58) Field of Classification Search
None
See application file for complete search history.

(56) References Cited

U.S. PATENT DOCUMENTS

| | | | |
|---|---|---|---|
| 6,045,896 A | 4/2000 | Boire et al. | |
| 6,322,881 B1 | 11/2001 | Boire et al. | |
| 2002/0045037 A1 | 4/2002 | Boire et al. | |
| 2002/0064662 A1 | 5/2002 | Lingle et al. | |
| 2003/0104221 A1 | 6/2003 | Stachowiak | |
| 2003/0165693 A1 | 9/2003 | Hartig et al. | |
| 2003/0165694 A1 | 9/2003 | Hartig et al. | |
| 2003/0186064 A1 | 10/2003 | Murata et al. | |
| 2003/0194488 A1 | 10/2003 | Stachowiak | |
| 2003/0194567 A1 | 10/2003 | Lingle et al. | |
| 2003/0194570 A1 | 10/2003 | Lingle et al. | |
| 2003/0198816 A1 | 10/2003 | Lingle et al. | |
| 2004/0224167 A1 | 11/2004 | Stachowiak et al. | |
| 2004/0253455 A1 | 12/2004 | Stachowiak | |
| 2005/0042459 A1 | 2/2005 | Kriltz et al. | |
| 2005/0191502 A1 | 9/2005 | Lemmer et al. | |
| 2005/0191513 A1 | 9/2005 | Hartig et al. | |
| 2005/0202254 A1 | 9/2005 | Nunez-Regueiro et al. | |
| 2006/0029816 A1 | 2/2006 | Lingle et al. | |

(Continued)

FOREIGN PATENT DOCUMENTS

EP    0 847 965 A1    6/1998
EP    0 963 960 A1    12/1999

(Continued)

OTHER PUBLICATIONS

International Search Report dated Dec. 2, 2014 in PCT/EP14/061096 Filed May 28, 2014.

*Primary Examiner* — Derek S Chapel
(74) *Attorney, Agent, or Firm* — Oblon, McClelland, Maier & Neustadt, L.L.P.

(57) ABSTRACT

The invention relates to low-emissivity and anti-solar glazing systems that change only very little in properties when they are subjected to a heat treatment. They comprise a stack of thin layers comprising an alternating arrangement of n infrared radiation reflecting functional layers and n+1 dielectric coatings, and a barrier layer directly superposed on the last functional layer furthest away from the substrate, characterized in that: (i) the first dielectric coating closest to the substrate comprises a layer made from an oxide, in direct contact with the substrate, (ii) the internal dielectric coating or coatings surrounded by two functional layers comprise a layer made from a silicon nitride or a silicon oxide with a thickness greater than 5 nm surrounded on both sides by layers made from an oxide other than silicon oxide with thicknesses greater than 5 nm, (iii) the barrier layer is based on zinc oxide or consists of an indium oxide possibly doped with tin, and (iv) the last dielectric coating furthest away from the substrate comprises, in order starting from the substrate: a layer made from an oxide other than silicon oxide with a thickness greater than 3 nm and a layer made from a silicon nitride or a silicon oxide with a thickness greater than 10 nm.

20 Claims, No Drawings

(56) References Cited

U.S. PATENT DOCUMENTS

| | | |
|---|---|---|
| 2006/0054492 A1 | 3/2006 | Stachowiak |
| 2006/0078747 A1 | 4/2006 | Novis et al. |
| 2006/0172139 A1 | 8/2006 | Lemmer et al. |
| 2007/0166553 A1 | 7/2007 | Nunez-Regueiro et al. |
| 2008/0085404 A1 | 4/2008 | Novis et al. |
| 2008/0138547 A1 | 6/2008 | Maschwitz |
| 2008/0268262 A1 | 10/2008 | Hartig et al. |
| 2008/0302462 A1 | 12/2008 | Sol et al. |
| 2008/0311389 A1 | 12/2008 | Roquiny et al. |
| 2009/0047509 A1* | 2/2009 | Gagliardi ................ C03C 17/36 428/336 |
| 2009/0195865 A1 | 8/2009 | Kleideiter et al. |
| 2009/0214880 A1 | 8/2009 | Lemmer et al. |
| 2011/0097590 A1 | 4/2011 | Lemmer et al. |
| 2011/0117371 A1 | 5/2011 | Nunez-Regueiro et al. |
| 2011/0236715 A1 | 9/2011 | Polcyn et al. |
| 2011/0268941 A1 | 11/2011 | Fischer et al. |
| 2012/0141806 A1 | 6/2012 | Nunez-Regueiro et al. |
| 2012/0308811 A1 | 12/2012 | Roquiny et al. |
| 2013/0019637 A1 | 1/2013 | Sol et al. |
| 2013/0108848 A1 | 5/2013 | Nunez-Regueiro et al. |
| 2016/0031751 A1* | 2/2016 | Mahieu ................ C03C 17/3618 428/623 |

FOREIGN PATENT DOCUMENTS

| | | |
|---|---|---|
| EP | 1 174 397 A2 | 1/2002 |
| EP | 1 329 307 A1 | 7/2003 |
| EP | 1 829 835 A1 | 9/2007 |
| FR | 2 781 789 A1 | 2/2000 |
| FR | 2 936 510 A1 | 4/2010 |
| WO | 03/042122 A2 | 5/2003 |
| WO | 2006/020753 A2 | 2/2006 |
| WO | 2006/122900 A1 | 11/2006 |
| WO | 2008/060453 A2 | 5/2008 |
| WO | 2014/125083 A1 | 8/2014 |

* cited by examiner

LOW-EMISSIVITY AND ANTI-SOLAR GLAZING

The present invention relates to glazing systems that simultaneously have low-emissivity and anti-solar properties and can be incorporated into windows of buildings or used in the field of automotive glazing.

Such glazing systems are commonly formed from a transparent substrate of the type: glass sheet covered with a system of thin layers comprising at least two functional layers based on an infrared radiation reflecting material and at least three dielectric coatings, wherein each functional layer is surrounded by dielectric coatings. The functional layers are generally layers of silver with a thickness of some manometers. With respect to the dielectric layers, they are transparent and traditionally made from metal oxides and/or nitrides. These different layers are deposited, for example, by means of vacuum deposition techniques such as magnetic field-assisted cathodic sputtering, more commonly referred to as "magnetron sputtering".

These glazing systems have anti-solar properties that may reduce the risk of excessive overheating, for example, in an enclosed space with large glazed surfaces and thus reduce the power load to be taken into account for air-conditioning in summer. In this case the glazing must allow the least possible amount of total solar energy radiation to pass through, i.e. it must have the lowest possible solar factor (SF or g). However, it is highly desirable that it guarantees a certain level of light transmission (LT) in order to provide a sufficient level of illumination inside the building. These somewhat conflicting requirements express the wish to obtain a glazing unit with a high selectivity (S) defined by the ratio of light transmission to solar factor. These glazing systems also have a low emissivity, which allows a reduction in the heat loss through high wavelength infrared radiation. Thus, they improve the thermal insulation of large glazed surfaces and reduce energy losses and heating costs in cold periods.

These glazing systems are generally assembled as multiple glazing units such as double or triple glazing units or even as laminated glazing units, in which the glass sheet bearing the coating stack is combined with one or more other glass sheets with or without coating, with the low-emissivity multilayer stack being in contact with the internal space between the glass sheets in the case of multiple glazing units, or in contact with the interlayer adhesive of the laminated unit in the case of laminated glazing units.

In some cases an operation to mechanically reinforce the glazing, such as thermal toughening of the glass sheet or sheets, becomes necessary to improve the resistance to mechanical stresses. For particular applications, it may also become necessary to give the glass sheets a more or less complex curvature by means of a bending operation at high temperature. In the processes of production and shaping of glazing systems there are certain advantages for conducting these heat treatment operations on the already coated substrate instead of coating an already treated substrate. These operations are conducted at a relatively high temperature, which is the temperature at which the functional layer based on infrared reflective material, e.g. based on silver, tends to deteriorate and lose its optical properties and properties relating to infrared radiation. These heat treatments consist in particular of heating the glass sheet to a temperature higher than 560° C. in air, e.g. between 560° C. and 700° C., and in particular around 640° C. to 670° C., for a period of about 3, 4, 6, 8, 10, 12 or even 15 minutes, depending on the type of treatment and the thickness of the sheet. In the case of a bending treatment, the glass sheet may then be bent to the desired shape. The toughening treatment then consists of abruptly cooling the surface of the flat or bent glass sheet by air jets or cooling fluid to obtain a mechanical reinforcement of the sheet.

Therefore, in the case where the coated glass sheet must undergo a heat treatment, quite specific precautions must be taken to form a coating structure that is able to withstand a thermal toughening and/or bending treatment, sometimes referred to hereafter by the term "temperable", without losing the optical and/or energy properties it has been created for. In particular, the dielectric materials used to form the dielectric coatings must withstand the high temperatures of the heat treatment without exhibiting any adverse structural modification. Examples of materials particularly suitable for this use are zinc-tin mixed oxide, silicon nitride and aluminium nitride. It is also necessary to ensure that the functional layers, e.g. silver-based layers, are not oxidised during the course of the treatment, e.g. by assuring that at the instant of treatment there are barrier layers that are capable of either oxidising in place of the silver by trapping free oxygen or blocking the free oxygen migrating towards the silver during the heat treatment.

In addition, the formation of these layer assemblies must also result in satisfactory colours both in reflection and transmission with demand tending towards the most complete neutrality possible. The difficulty is to combine the colorimetric requirements with those associated with "base" conditions: high light transmission, very low emissivity, ability to withstand heat treatment, all at the same time.

Another requirement that must be increasingly taken into account results from the fact that products that have not been heat treated and others that have been heat treated must sometimes be combined with one another for the same application, e.g. within the same building facade. Consequently, it was previously necessary to develop and produce two types of stacks of low-emissivity layers in parallel, one for non-toughened glazing units and the other for glazing units intended to be toughened or bent, and this is complicated both in terms of research and development and in production stock management in particular. Since then, so-called "self-matchable" coating stacks have been developed that change very little in their properties, in particular their optical and energy properties, for the case where the substrate is subjected to a toughening or bending type of heat treatment.

Moreover, while the principles ruling the optical properties of materials forming the layers are well known, an additional difficulty lies in the production methods of these glazing units. The deposition conditions and in particular the deposition rate are dependent on the nature of the materials considered. The deposition rate must be sufficient for economically acceptable industrial production. It depends on multiple factors that guarantee stability of function over time and over the whole surface of the sheet and the absence of defects in the layer.

Several solutions have been proposed to meet these diverse requirements, but no solution has provided a really satisfactory glazing unit that will allow us to comply with the requirements of these new demands.

EP 1 140 721 describes coating stacks of silver-based layers of the type glass/dielectric I/Ag I/AZO/dielectric II/Ag II/AZO/dielectric III, in which, inter alia, the dielectrics include a lower layer of zinc-tin mixed oxide and an upper layer of zinc oxide. EP 1 140 721 gives us to understand that the coating stacks that it describes can be heat treated and that they only exhibit slight variations in their optical properties after heat treatment. However, it has been shown that after heat treatment a haze and unacceptable spots appeared on layers of this type, and that the electrical resistance per square was increased, itself giving a higher and therefore less favourable emissivity (see our comparative example 1 described below).

Document WO03/010105 describes coating stacks with double silver layer, the specificity of which is to include a Ti layer under the silver layers. All the proposed stacks begin with a nitride layer on the glass. They are presented as capable of being heat treated while retaining the thermal performance levels of the coating stacks minimising optical modifications thereof and minimising the appearance of optical defects. However, proposed stacks have a not inconsiderable fault: the chemical stability of these products before heat treatment is not sufficient (see also our comparative example 2 described below). Hence, since these layers must be able to be used without subsequent heat treatment or else stored and possibly transported sometimes long before undergoing a heat treatment, their ageing resistance before heat treatment must be adequate.

Thus, the aim of the invention is to seek to develop a new type of stack of thin low-emissivity and anti-solar layers that is effective in terms of optical and energy properties and that retains these performance levels if then subjected to a toughening or bending type of heat treatment or not.

The following information is used in the present invention:

light transmission (LT) is the percentage of incident light flux, illuminant D65/2°, transmitted by the glazing.

light reflection (LR) is the percentage of incident light flux, illuminant D65/2°, reflected by the glazing. It may be measured from the layer side (LRc) or the substrate side (LRg).

energy transmission (ET) is the percentage of incident energy radiation transmitted by the glazing calculated in accordance with standard EN410.

energy reflection (ER) is the percentage of incident energy radiation reflected by the glazing calculated in accordance with standard EN410. It may be measured on the external side of the building or vehicle (ERext) or the internal side of the building or vehicle (ERint).

solar factor (SF or g) is the percentage of incident energy radiation that is directly transmitted by the glazing, on the one hand, and absorbed by this, then radiated in the opposite direction to the energy source in relation to the glazing. It is here calculated in accordance with standard EN410.

the U value (coefficient k) and emissivity (E) are calculated in accordance with standards EN673 and ISO 10292.

the CIELAB 1976 values (L*a*b*) are used to define the tints. They are measured with illuminant D65/10°.

$\Delta E^* = \sqrt{(\Delta L^*)^2 + (\Delta a^*)^2 + (\Delta b^*)^2}$ represents the tint variation during the heat treatment, i.e. the difference between before and after heat treatment colours.

the resistance per square ($R^2$) ("sheet resistance"), expressed in ohms per square ($\Omega/\square$), measures the electrical resistance of thin films.

When values are referred to as "in the range of between a and b", they may be equal to a or b.

The positioning of the stack of layers in a multiple glazing structure is given according to the classic sequential numbering of the faces of a glazing unit, face 1 being on the exterior of the building or vehicle and face 4 (in the case of a double glazing unit) or face 6 (in the case of a triple glazing unit) on the interior.

When referring to silicon nitride or silicon oxide layers herein, it should be understood that the layers may also incorporate a small quantity of aluminium, as is well-known in the art of magnetron sputtered coatings. Such aluminium is included as doping agent, generally in a quantity of 10 Wt. % at most.

For the sake of clarity, when using terms like "below", "above", "lower", "upper", "first" or "last" herein, it is always in the context of a sequence of layers starting from the glass below, going upward, further away from the glass. Such sequences may comprise additional intermediate layers, in between the defined layers, except when a direct contact is specified.

The present invention relates to a glazing unit as exemplified by the independent claims and the dependent claims present preferred embodiments.

The invention concerns a glazing unit comprising a transparent substrate provided with a stack of thin layers comprising an alternating arrangement of n infrared radiation reflecting functional layers and n+1 dielectric coatings, with n>1, such that each functional layer is surrounded by dielectric coatings. Indeed, the present invention relates solely to coating stacks comprising at least two infrared radiation reflecting functional layers. The glazing according to the invention comprises a barrier layer directly superposed on the last functional layer furthest away from the substrate, and is characterised in that:

(i) the first dielectric coating closest to the substrate comprises a layer made from an oxide, in direct contact with the substrate, (ii) the internal dielectric coating or coatings surrounded by two functional layers comprise a layer made from a silicon nitride or a silicon oxide with a thickness greater than 5 nm surrounded on both sides by layers made from an oxide other than silicon oxide with thicknesses greater than 5 nm, (iii) the barrier layer is based on zinc oxide or consists of an indium oxide possibly doped with tin, and (iv) the last dielectric coating furthest away from the substrate comprises, in order starting from the substrate: a layer made from an oxide other than silicon oxide with a thickness greater than 3 nm and a layer made from a silicon nitride or a silicon oxide with a thickness greater than 10 nm.

Because of the particular selection of layers of the coating stack and primarily because of the combination of the presence of a layer made from an oxide in direct contact with the substrate, a layer of silicon nitride or oxide in the internal dielectric coating or coatings surrounded by oxide layers, and of an adequate layer of silicon nitride or silicon oxide in the last dielectric coating, such glazing units may thus provide the following advantages (coating on a standard 6 mm thick clear soda-lime float glass sheet incorporated into a double glazing unit with another standard 4 mm thick clear soda-lime float glass sheet, space between glass sheets of 15 mm filled to 90% with argon, stack of layers in position 2):

a high light transmission (LT 68%) at the same time as a low emissivity ($E \leq 0.038$, preferably $E \leq 0.025$) to limit heat losses;

a low solar factor (SF<41%) to enable reduction of the risk of excess overheating as a result of sunshine;

a high selectivity (LT/SF≥1.75);

an insulating property enabling a value $U \leq 1.1$ W/(m$^2$K), preferably $U \leq 1.0$ W/(m$^2$K) to be reached;

a neutrality of tint in transmission and in reflection, whether in a single glazing or multiple glazing, with preferred values in single glazing:

in transmission: $88 \leq L^* \leq 94$  $-6 \leq a^* \leq +4$  $-4 \leq b^* \leq +4$ in reflection substrate side: $25 \leq L^* \leq 40$  $-4 \leq a^* \leq +3$  $-16 \leq b^* \leq 0$ the possibility of being heat treated, the coating being resistant to high temperatures, or of being used without heat treatment;

an aesthetic appearance without flaw, with an extremely limited or even non-existent haze without or after heat treatment, and the absence of unacceptable spots after heat treatment;

the retention of optical and energy properties virtually unchanged after heat treatment allowing the use of products that have been heat treated or not one beside the other ("self-matchability"): no or little change in colour in transmission and in reflection ($\Delta E^* \leq 8$, preferably $\leq 5$, more preferably $\leq 2$) and/or no or little change in light transmission and reflection and energy values ($\Delta = |(\text{value before heat treatment}) - (\text{value after heat treatment})| \leq 5$, preferably $\leq 3$, more preferably $\leq 1$), in single glazing.

an adequate chemical stability for use without heat treatment or for the time interval before heat treatment, and in particular a result of the climatic chamber test or the salt spray test according to standard EN1036-2012 that does not give any defect or any discoloration visible to the naked eye after 1 day, preferably after 3 days.

The inventors have indeed found that not only was it essential to have a layer made from an oxide (and not, as in many known coating stacks, a nitride such as aluminium or silicon nitride) in direct contact with the substrate in particular to assure the chemical stability of the product that has not been heat treated, but also essential to have a layer of silicon nitride or oxide surrounded by oxide layers in the internal dielectric coating or coatings, in particular to limit the appearance of haze and degradation of the resistance per square after heat treatment; and finally that it was essential to have a layer of silicon nitride or silicon oxide above an oxide layer in the last dielectric coating, in addition to a barrier layer based on zinc oxide or consisting of an indium oxide possibly doped with tin, in particular for the chemical stability of the non-heat treated product, and for the self-matchability and absence of defect after heat treatment.

The first dielectric according to the invention comprises a layer made from an oxide, as single layer or as the lowest layer. Advantageously, this layer made from an oxide, which is in direct contact with the substrate, is a layer of an oxide of at least one element selected from Zn, Sn, Ti and Zr. It is preferably a layer of zinc-tin mixed oxide, more preferably a layer of zinc-tin mixed oxide, in which the proportion of zinc-tin is close to 50-50% by weight ($Zn_2SnO_4$), e.g. 52-48 Wt. %. The zinc-tin mixed oxide may be advantageous in that it has a good deposition rate compared, for example, to $SiO_2$ or $Al_2O_3$, and/or in that it has a good stability compared, for example, to pure ZnO or bismuth oxide. Moreover, it may be advantageous in that it has less tendency to generate haze after heat treatment of the stack compared, for example, to the oxides of Ti or Zr. The layer made from an oxide in direct contact with the substrate advantageously has a thickness of at least 15 nm, preferably at least 20 nm. These minimum thickness values allow, inter alia, the chemical stability of the product that has not been heat treated to be assured, as well as assuring the resistance to the heat treatment.

The first dielectric coating preferably has a thickness of at least 15 nm, more preferably at least 20 nm. Its thickness is preferably 55 nm at most, more preferably 50 nm at most.

We have given the term "internal dielectric coating(s)" to the dielectric coating(s) surrounded by two functional layers. In the case of a coating stack with two functional layers, there is a single internal dielectric coating. In the case of a coating stack with three functional layers, there are two internal dielectric coatings. In the following description when reference is made in general to the internal dielectric coating, even if not specifically stated, the same considerations apply to the case having several internal dielectric coatings. The internal dielectric coating according to the invention comprises a layer made from a silicon nitride or a silicon oxide with a thickness greater than 5 nm surrounded on both sides by layers made from an oxide other than silicon oxide with thicknesses greater than 5 nm. Hence, the internal dielectric coating according to the invention comprises the following sequence: in order starting from the substrate, but not necessarily in direct contact:

oxide other than $SiO_2//Si_3N_4$ or $SiO_2//$oxide other than $SiO_2$.

The layers of the internal dielectric coating made from an oxide other than silicon oxide with thicknesses greater than 5 nm are preferably layers of oxide of at least one element selected from Zn, Sn, Ti and Zr. These are preferably layers of zinc-tin mixed oxide, more preferably layers of zinc-tin mixed oxide, in which the proportion of zinc-tin is close to 50-50% by weight ($Zn_2SnO_4$), e.g. 52-48 Wt. %. Alternatively, these may be layers of titanium-zirconium mixed oxide, e.g. in a weight ratio of Ti/Zr of about 65/35. The layers of the internal dielectric coating made from an oxide other than silicon oxide may themselves be formed from one or more layers. They preferably have a thickness of at least 5 nm, at least 8 nm or at least 10 nm, more preferably at least 12 nm or at least 15 nm. Their thickness is preferably 50 nm at most or 40 nm at most, more preferably 30 nm at most. Advantageously, the layer of the internal dielectric coating made from an oxide other than silicon oxide located under the layer of the internal dielectric coating made from a silicon nitride or a silicon oxide is thicker than that located above the latter. This may improve the "self-matchability" of the product.

The layer of the internal dielectric coating made from a silicon nitride or silicon oxide with a thickness greater than 5 nm preferably has a thickness of at least 8 nm or at least 10 nm, more preferably at least 12 nm. Its thickness is preferably 55 nm at most or 50 nm at most, more preferably 45 nm at most. Silicon nitride is generally preferred to silicon oxide, since it may be easier to deposit industrially by magnetron sputtering and because with a refractive index slightly higher than that of silicon oxide ($n_{SiN}=2.0$; $n_{SiO2}=1.5$), it enables even better opto-energetic properties to be obtained. Alternatively, this layer could rather be a layer of aluminium oxide or aluminium nitride, however this solution was not preferred mainly for coating durability reasons.

The internal dielectric coating preferably has a thickness of at least 24 nm or at least 30 nm, more preferably at least 35 nm or at least 40 nm. Its thickness is preferably 150 nm at most or 120 nm at most, more preferably 100 nm at most.

As uppermost layer directly under and in contact with the functional layer, at least one of the dielectric coatings with a functional layer superposed on it (i.e. the first dielectric coating or an internal dielectric coating), or preferably each dielectric coating with a functional layer superposed on it, may advantageously also comprise a zinc oxide-based layer, sometimes referred to as "nucleation" or "wetting" layer, which assists the growth of the silver on top of it and helps increase the resistance per square of the product. This zinc oxide-based layer may consist of zinc oxide or possibly be doped with other metals, e.g. aluminium, in a proportion generally of 10% by weight at most, preferably around 2% by weight. It preferably has a thickness of 15 nm at most, preferably in the range of between 1.5 and 10 nm, more preferably between 3 and 10 nm.

In accordance with the invention the stack comprises a barrier layer directly superposed on the last functional layer furthest away from the substrate, i.e. above and in direct contact with said last functional layer. This barrier layer is either based on zinc oxide, (i.e. comprising Zn in a quantity of at least 50 at. %, preferably at least 60 at. %, more preferably at least 70 at. %, still more preferably at least 80 at. %, of the metallic part of the oxide), or consists of an indium oxide possibly doped with tin. More preferably said barrier consists of a zinc oxide possibly doped with aluminium or of an indium oxide possibly doped with tin. Still more preferably, said barrier layer is a layer of pure ZnO (designated as iZnO) or a layer of zinc oxide doped with aluminium (designated as AZO) in a proportion of 10% by weight at most, preferably of around 2% by weight. These types of barrier have the advantage of improving the "self-matchability" of the product and the resistance per square. The barrier layer preferably has a thickness of 20 nm at most or 18 nm at most, more preferably 16 nm at most, preferably in the range of between 1 and 18 nm or between 2 and 18 nm, more preferably between 3 and 16 nm.

The last dielectric coating according to the invention furthest away from the substrate comprises, in order starting from the substrate: a layer made of an oxide other than silicon oxide with a thickness greater than 3 nm and a layer made from a silicon nitride or a silicon oxide with a thickness greater than 10 nm.

The layer of the last dielectric coating made from an oxide with a thickness greater than 3 nm is preferably a layer of oxide of at least one element selected from Zn, Sn, Ti and Zr. It is preferably a layer of zinc-tin mixed oxide, more preferably a layer of zinc-tin mixed oxide, in which the proportion of zinc-tin is close to 50-50% by weight ($Zn_2SnO_4$). It preferably has a thickness of at least 4 nm, more preferably at least 5 nm or at least 6 nm. Its thickness is preferably 25 nm at most or 20 nm at most, more preferably 18 nm at most or 15 nm at most.

Above this oxide layer of the last dielectric coating, but not necessarily in direct contact with it, is the layer made from a silicon nitride or a silicon oxide with a thickness greater than 10 nm. It preferably has a thickness of at least 12 nm or at least 14 nm, more preferably at least 15 nm or at least 16 nm. Its thickness is preferably 40 nm at most or 35 nm at most, more preferably 30 nm at most or 25 nm at most. Silicon nitride is generally preferred to silicon oxide, since it may be easier to deposit industrially by magnetron sputtering and because it may provide in the last dielectric a better mechanical stability and a better resistance to heat treatment than a silicon oxide. This silicon nitride layer may be the last layer of the coating stack. Alternatively, this layer could rather be a layer of aluminium oxide or aluminium nitride, however this solution was not preferred mainly for coating durability reasons.

Advantageously, the last dielectric coating may comprise a protective topcoat forming the last layer of the coating stack. This preferably consists of an oxide or substoichiometric oxide of at least one element selected from Ti and Zr, more preferably of a titanium-zirconium mixed oxide, e.g. in a weight ratio of Ti/Zr of close to 65/35. Such a layer may improve the chemical and/or mechanical stability of the glazing. This protective topcoat preferably has a thickness of at least 3 nm, preferably at least 5 nm. Its thickness is preferably 15 nm at most or 12 nm at most, more preferably 10 nm at most or 8 nm at most.

The last dielectric coating preferably has a thickness of at least 10 nm or at least 15 nm, more preferably at least 20 nm or at least 22 nm. Its thickness is preferably 80 nm at most or 60 nm at most, more preferably 50 nm at most or 48 nm at most.

The dielectric coatings may additionally comprise one or more other dielectric layers, should the direct contacts between layers described above as essential be respected: for example, one or more layers of dielectric material made from metal oxide, nitride or oxynitride, preferably ZnO, $TiO_2$, $SnO_2$, $Si_3N_4$, $ZrO_2$, zinc-tin mixed oxide or titanium-zirconium mixed oxide. In the case of a zinc-tin mixed oxide, this may have a zinc-tin proportion close to 50-50% by weight or a zinc-tin proportion close to 90-10% by weight.

Advantageously, an internal dielectric coating may comprise a dielectric material with a refractive index higher than 2.2. This type of material may indeed enable the selectivity of the glazing to be further increased. It is preferably an oxide of at least one element selected from Ti, Nb and Zr, more preferably titanium-zirconium mixed oxide, e.g. in a weight ratio of Ti/Zr of close to 65/35.

The infrared radiation reflecting functional layers are preferably silver-based layers that may consist of silver or possibly be doped with palladium or gold, for example, in a proportion of 5% by weight at most, preferably of around 1% by weight. The incorporation of a small quantity of doping agent in the silver-based layer may improve the chemical stability of the stack. The functional layers advantageously have a thickness of at least 6 nm or at least 8 nm, preferably at least 9 nm. Their thickness is preferably 22 nm at most or 20 nm at most, more preferably 18 nm. These thickness ranges may enable the desired low emissivity and anti-solar function to be achieved while retaining a good light transmission. In a coating stack with two functional layers it may be preferred that the thickness of the second functional layer, that furthest away from the substrate, is slightly greater than that of the first to obtain a better selectivity. In the case of a coating stack with two functional layers, the first functional layer may have a thickness, for example, of between 8 and 18 nm and the second functional layer may have a thickness between 10 and 20 nm.

In some embodiments of the invention the stack may also comprise a barrier layer directly superposed on (i.e. above and in direct contact with) at least one or preferably on each functional layer other than the last functional layer. The barrier layer is either based on zinc oxide, (i.e. comprising Zn in a quantity of at least 50 at. %, preferably at least 60 at. %, more preferably at least 70 at. %, still more preferably at least 80 at. %, of the metallic part of the oxide), or consists of an indium oxide possibly doped with tin. More preferably said barrier consists of a zinc oxide possibly doped with aluminium or of an indium oxide possibly doped with tin. Still more preferably, the barrier layer is a layer of pure ZnO (designated as iZnO) or a layer of zinc oxide doped with aluminium (designated as AZO) in a proportion of 10% by weight at most, preferably of around 2% by weight. These types of barrier have the advantage of improving the "self-matchability" of the product and the resistance per square. The barrier layer preferably has a thickness of 20 nm at most or 18 nm at most, more preferably 16 nm at most, preferably in the range of between 1 and 18 nm or between 2 and 18 nm, more preferably between 3 and 16 nm.

In some embodiments of the invention the stack of thin layers comprises at least or consists of, in order starting from the substrate:
(i) a layer of zinc-tin mixed oxide with a thickness in the range of between 20 and 40 nm,
(ii) a layer of zinc oxide, possibly doped, with a thickness in the range of between 3 and 10 nm,
(iii) a first silver-based functional layer with a thickness in the range of between 9 and 17 nm,
(iv) a barrier layer of zinc oxide, possibly doped with aluminium, with a thickness in the range of between 2 and 16 nm,
(v) optionally, a layer of zinc oxide or a zinc oxide-based layer comprising another metal (e.g. Al) in a Zn/metal weight ratio of at least 80/20, preferably at least 90/10, with a thickness in the range of between 4 and 10 nm,
(vi) a layer of zinc-tin mixed oxide with a thickness in the range of between 10 and 50 nm,
(vii) a layer of silicon nitride with a thickness in the range of between 10 and 50 nm,
(viii) a layer of zinc-tin mixed oxide with a thickness in the range of between 5 and 50 nm,
(ix) a layer of zinc oxide, possibly doped, with a thickness in the range of between 3 and 10 nm,
(x) a second silver-based functional layer with a thickness in the range of between 10 and 20 nm,
(xi) a barrier layer of zinc oxide, possibly doped with aluminium, with a thickness in the range of between 2 and 16 nm,
(xii) optionally, a layer of zinc oxide or a zinc oxide-based layer comprising another metal (e.g. Al) in a Zn/metal weight ratio of at least 80/20, preferably at least 90/10, with a thickness in the range of between 4 and 10 nm,
(xiii) a layer of zinc-tin mixed oxide with a thickness in the range of between 3 and 20 nm,
(xiv) a layer of silicon nitride with a thickness in the range of between 10 and 35 nm, and
(xv) optionally, a layer of titanium-zirconium mixed oxide with a thickness in the range of between 3 and 10 nm.

In these embodiments of the invention the thickness of layer (vi) or, if applicable, the sum of the thicknesses of layers (v) and (vi) is advantageously greater than the sum of the thicknesses of layers (viii) and (ix).

In other embodiments of the invention an internal dielectric coating comprises at least or consists of, in order starting from the substrate:
(i) optionally, a layer of zinc oxide or a zinc oxide-based layer comprising another metal (e.g. Al) in a Zn/metal weight ratio of at least 80/20, preferably at least 90/10, with a thickness in the range of between 4 and 10 nm,
(ii) a layer of zinc-tin mixed oxide with a thickness in the range of between 10 and 30 nm,
(iii) a layer of silicon nitride with a thickness in the range of between 10 and 45 nm,
(iv) a layer of zinc-tin mixed oxide with a thickness in the range of between 5 and 30 nm,
(v) a layer of zinc oxide, possibly doped, with a thickness in the range of between 3 and 10 nm,
as well as a layer of titanium-zirconium mixed oxide with a thickness in the range of between 2 and 30 nm between layers (ii) and (iii) or between layers (iii) and (iv) or two layers of titanium-zirconium mixed oxide with a thickness in the range of between 2 and 30 nm, one between layers (ii) and (iii) and the other between layers (iii) and (iv).

In these embodiments of the invention the thickness of layer (ii) or, if applicable, the sum of the thicknesses of layers (i) and (ii), to which there may be cause to add the thickness of a layer of titanium-zirconium mixed oxide, is advantageously greater than the sum of the thicknesses of layers (iv) and (v), to which there may be cause to add the thickness of a layer of titanium-zirconium mixed oxide.

The glazing units according to the invention are preferably used in multiple glazing units, e.g. double or triple glazing units. They may have the following properties:

|  |  | Single Glazing (SG) | Double Glazing (DG) as defined above |
|---|---|---|---|
| Coating stack with 2 functional layers |  |  |  |
| LT before or after heat treatment |  | — | ≥68% |
| LRc before or after heat treatment |  | ≤15% | — |
| LRg before or after heat treatment |  | ≤15% | — |
| ET before or after heat treatment |  | <45% | — |
| ΔLT, ΔLRc, ΔLRg, ΔET, ΔERc, ΔERg before/after heat treatment |  | ≤5, ≤3, ≤1 | — |
| $R^2$ before or after heat treatment |  | between 1.0 and 3.5 Ω/□ | — |
| g before or after heat treatment |  | — | ≤41% |
| Δg before/after heat treatment |  | — | ≤5%, ≤3%, ≤1% |
| Selectivity |  |  | ≥1.75 |
| Colour in transmission | L* | between 88 and 94 |  |
| before or after heat treatment | a* | between −6 and 4 |  |
|  | b* | between −4 and +4 |  |
| ΔE* in transmission |  | ≤8, ≤5, ≤2 | ≤8, ≤5, ≤2 |
| Colour in reflection glass side | L* | between 25 and 40 |  |
| in SG or external side in DG | a* | between −4 and +3 |  |
| before or after heat treatment | b* | between −16 and −0 |  |
| ΔE* in reflection (glass or ext.) |  | ≤8, ≤5, ≤2 | ≤8, ≤5, ≤2 |
| Emissivity |  | <0.038, <0.025 |  |
| Coating stack with 3 functional layers |  |  |  |
| LT before or after heat treatment |  |  | between 50% and 65% |
| ΔE* in transmission |  | ≤8, ≤5 | ≤8, ≤5 |
| ΔE* in reflection (glass or ext.) |  | ≤8, ≤5 | ≤8, ≤5 |
| Selectivity |  |  | ≥1.9 |

Particular embodiments of the invention will now be described by way of example with reference to Examples 1-10 and comparative examples 1-4.

All thicknesses of the examples and comparative examples are given in Ångströms. All the layers have been deposited using magnetic field-assisted cathodic sputtering under vacuum. When heat treatment took place, this was conducted in the following conditions: curing in a static oven at 670° C. for 9 min. 30 sec.

EXAMPLES 1 TO 8

The stacks of layers in accordance with the invention recorded in Table I were deposited onto a glass sheet and then heat treated. Resistance per square values are given in the table, before and after heat treatment, showing values that have been modified very little by this treatment (Δ<0.4). These glazing units have proved to be "temperable" and "self-matchable". The heat treated product exhibits no haze or spots and before heat treatment the product has a good chemical stability.

The following properties were measured on samples according to Example 1a, Example 7 and Example 8 before heat treatment and the Δ variations calculated between the values before and after heat treatment:

|  |  | Ex. 1a | | Ex. 7 Single Glazing (SG) | Ex. 8 Single Glazing (SG) |
| --- | --- | --- | --- | --- | --- |
|  |  | Single Glazing (SG) | Double Glazing (DG) as defined above | | |
| LT |  |  | 70.3% | 79.5% | 78.5% |
| LRc (layer or int.) |  |  | 13.3% | 7.6% | 8.0% |
| LRg (glass or ext.) |  |  | 14% | 7.9% | 9.2% |
| ET |  |  | 36% |  |  |
| g |  |  | 38.7% |  |  |
| ΔLT before/after heat treatment |  |  | 0.8 | 0.8 | 1.2 |
| ΔLRc before/after heat treatment |  |  | 0.3 | 0.5 | 1.2 |
| ΔLRg before/after heat treatment |  |  | 0.6 | 0.8 | 0.5 |
| Colour in transmission | L* | 90.8 |  | 91.4 | 91.0 |
|  | a* | −0.6 |  | −2.3 | −2.2 |
|  | b* | 2.8 |  | 1.6 | 1.8 |
| ΔE* in transmission |  | 2.6 |  | 1.6 | 1.6 |
| Colour in reflection glass side | L* | 34.3 |  | 34.0 | 36.5 |
|  | a* | −1.9 |  | −2.5 | −3.7 |
|  | b* | −5.9 |  | −7.1 | −4.4 |
| ΔE* in reflection (glass) |  | 3.9 |  | 2.7 | 3.4 |
| Colour in reflection layer side | L* |  |  | 33.3 | 34.1 |
|  | a* |  |  | −6.71 | −13.0 |
|  | b* |  |  | −4.8 | −2.5 |
| ΔE* in reflection (layer) |  | 1.1 |  | 2.8 | 4.2 |

EXAMPLE 9

An example of coating stack with three functional layers in accordance with the invention was deposited onto a glass sheet and is shown in Table II.

This type of coating stack is resistant to heat treatment and is self-matchable (ΔE*<8). In double glazing (as defined above) it gives an LT value of between 50 and 65% and a selectivity higher than 1.9.

COMPARATIVE EXAMPLES 1 AND 2

The stacks of layers not in accordance with the invention recorded in Table III were deposited onto a glass sheet and then heat treated. Resistance per square values are given in the table for before and after heat treatment showing values that were greatly degraded by this treatment. These glazing units cannot therefore be considered "self-matchable". Moreover, a heavy haze perceptible to the naked eye developed after the heat treatment in these comparative examples.

Comparison between Comparative Example 1 and the examples according to the invention demonstrates:

the advantage of having a layer of silicon nitride or oxide surrounded by oxide layers in the internal dielectric coating(s) in particular to limit the appearance of haze and increase the resistance per square after heat treatment, which leads to a likewise increased emissivity, and the advantage of having a layer of silicon nitride above an oxide layer in the last dielectric coating, in particular for self-matchability.

Comparative Example 2 shows a coating stack, in which the layer in contact with the glass is made of nitride and not an oxide as in the present invention. Samples according to this example were subjected to the climatic chamber tests and the salt spray ("neutral salt spray") test in accordance with standard EN 1096-2012 before any heat treatment. After only 1 day in the climatic chamber the samples according to Comparative Example 2 were more degraded than those according to Example 1; it was the same after 3 days. After only 1 day in the salt spray the samples according to Comparative Example 2 were more degraded than those according to Example 1; it was the same after 2 days. These degradations were evident through the appearance of spots and/or defects visible to the naked eye. This demonstrates the advantage in particular of having a layer made of an oxide in direct contact with the substrate for a better chemical stability of the product that has not been heat treated.

In the following tables:

ZSO5 represents a zinc-tin mixed oxide in which the proportion of zinc-tin is close to 50-50% by weight ($Zn_2Sn_2O_4$)

AZO represents a zinc oxide doped with aluminium in an approximate proportion of 2% by weight SiN represents a silicon nitride TZO represents a titanium-zirconium mixed oxide in a weight ratio of Ti/Zr of about 65/35

TABLE I

| | | | | | | | | | | | | | | | before heat treatment | after heat treatment |
| --- | --- | --- | --- | --- | --- | --- | --- | --- | --- | --- | --- | --- | --- | --- | --- | --- |
| glass | ZSO5 | ZnO | Ag | AZO | ZnO | ZSO5 | SiN | ZSO5 | ZnO | Ag | AZO | ZnO | ZSO5 | SiN | | |
| ex. 1 | 320 | 80 | 120 | 150 | 80 | 207 | 200 | 207 | 80 | 135 | 150 | 70 | 33 | 170 | $R^2 =$ 1.85 Ω/☐ | $R^2 =$ 1.51 Ω/☐ |
| ex. 1a | 333 | 80 | 136 | 30 | 80 | 209 | 350 | 239 | 60 | 145 | 30 | 70 | 38 | 240 | | |

TABLE I-continued

| glass | ZSO5 | ZnO | Ag | AZO | ZnO | ZSO5 | SiN | ZSO5 | ZnO | Ag | AZO | ZnO | SiN | before heat treatment | after heat treatment |
|---|---|---|---|---|---|---|---|---|---|---|---|---|---|---|---|
| ex. 2 | 310 | 80 | 112 | 150 | 60 | 100 | 200 | 300 | 60 | 152 | 150 | 30 | 190 | $R^2$ = 1.80 Ω/□ | $R^2$ = 1.50 Ω/□ |
| ex. 3 | 310 | 80 | 112 | 150 | 60 | 100 | 150 | 350 | 60 | 152 | 150 | 30 | 190 | $R^2$ = 1.81 Ω/□ | $R^2$ = 1.43 Ω/□ |
| ex. 4 | 310 | 80 | 112 | 150 | 60 | 100 | 100 | 400 | 60 | 152 | 150 | 30 | 190 | $R^2$ = 1.79 Ω/□ | $R^2$ = 1.46 Ω/□ |

| glass | ZSO5 | ZnO | Ag | AZO | ZnO | ZSO5 | SiO2 | ZSO5 | ZnO | Ag | AZO | ZnO | SiN | | |
|---|---|---|---|---|---|---|---|---|---|---|---|---|---|---|---|
| ex. 5 | 310 | 80 | 112 | 150 | 60 | 100 | 150 | 400 | 60 | 152 | 150 | 30 | 190 | $R^2$ = 1.81 Ω/□ | $R^2$ = 1.50 Ω/□ |

| glass | ZSO5 | ZnO | Ag | AZO | ZnO | ZSO5 | TZO | SiN | TZO | ZSO5 | ZnO | Ag | AZO | ZnO | ZSO5 | SiN | | |
|---|---|---|---|---|---|---|---|---|---|---|---|---|---|---|---|---|---|---|
| ex. 6 | 327 | 80 | 105 | 50 | 80 | 246 | 50 | 232 | 48 | 246 | 80 | 174 | 50 | 70 | 76 | 180 | $R^2$ = 1.70 Ω/□ | $R^2$ = 1.31 Ω/□ |

| glass | ZSO5 | ZnO | Ag | AZO | ZSO5 | SiN | ZS05 | TZO | ZnO | Ag | AZO | ZSO5 | SiN | | |
|---|---|---|---|---|---|---|---|---|---|---|---|---|---|---|---|
| ex. 7 | 312 | 50 | 123 | 40 | 287 | 350 | 142 | 40 | 50 | 151 | 40 | 117 | 240 | $R^2$ = 1.63 Ω/□ | $R^2$ = 1.26 Ω/□ |

| glass | ZSO5 | ZnO | Ag | AZO | ZSO5 | SiN | ZSO5 | ZnO | Ag | AZO | ZSO5 | SiN | TZO | | |
|---|---|---|---|---|---|---|---|---|---|---|---|---|---|---|---|
| ex. 8 | 312 | 50 | 128 | 40 | 284 | 350 | 179 | 50 | 141 | 40 | 108 | 220 | 20 | $R^2$ = 1.4 Ω/□ | $R^2$ = 1.2 Ω/□ |

TABLE II

| glass | ZSO5 | ZnO | Ag | AZO | ZSO5 | SiN | ZSO5 | ZnO | Ag | AZO | ZSO5 | SiN | ZSO5 | ZnO | Ag | AZO | ZSO5 | SiN | TZO |
|---|---|---|---|---|---|---|---|---|---|---|---|---|---|---|---|---|---|---|---|
| ex. 9 | 420 | 56 | 124 | 30 | 217 | 350 | 167 | 50 | 118 | 30 | 136 | 350 | 86 | 50 | 154 | 30 | 54 | 200 | 30 |

TABLE III

| glass | ZSO5 | ZnO | Ag | AZO | ZnO | ZSO5 | ZnO | Ag | AZO | ZnO | ZSO5 | before heat treatment | after heat treatment |
|---|---|---|---|---|---|---|---|---|---|---|---|---|---|
| | | | | | | | | | | | | $R^2$ = | $R^2$ = |
| comp. ex. 1 | 239 | 80 | 80.7 | 40 | 50 | 677 | 80 | 117 | 40 | 50 | 275 | 1.93 Ω/□ ε = 0.023 | 3.50 Ω/□ ε = 0.034 |

| glass | SiN | ZSO | ZnO | Ag | AZO | ZSO | ZnO | AlN | ZSO5 | ZnO | Ag | AZO | ZnO | ZSO5 | SiN |
|---|---|---|---|---|---|---|---|---|---|---|---|---|---|---|---|
| comp. ex. 2 | 430 | 41 | 77 | 83 | 50 | 25 | 13 | 500 | 118 | 80 | 112 | 150 | 60 | 100 | 200 |

EXAMPLE 10 AND COMPARATIVE EXAMPLES 3 AND 4

An example of coating stack in accordance with the invention and two Comparative Examples not in accordance with the invention were deposited onto a glass sheet, as follows:

| glass | ZSO5 | ZnO | Ag | AZO | ZnO | ZSO5 | SiN | ZSO5 | ZnO | Ag | AZO | ZSO5 | SiN | TZO |
|---|---|---|---|---|---|---|---|---|---|---|---|---|---|---|
| ex. 10 | 260 | 80 | 112 | 50 | 60 | 250 | 200 | 250 | 60 | 142 | 50 | 85 | 240 | 40 |
| c. ex. 3 | 310 | 80 | 112 | 150 | 60 | 100 | 200 | 300 | 60 | 152 | 150 | — | 240 | 40 |
| c. ex. 4 | 310 | 80 | 112 | 75 | 60 | 100 | 350 | 150 | 60 | 142 | 75 | — | 190 | 120 |

The following properties were observed:

| | before heat treatment | | Δ before/after heat treatment | |
|---|---|---|---|---|
| | Neutral Salt Spray | Neutral Salt Spray | | |
| | 1 day | 2 days | ΔLT | ΔET |
| ex. 10 | 4 | 3.5 | 1.1 | 1.1 |
| c. ex. 3 | 1 | 1 | 7.9 | 4.2 |
| c. ex. 4 | 4 | 1 | 6.2 | 2.9 |

The results from the Neutral Salt Spray Test are given in this table on a scale from 1 to 5, 5 being not degraded, 1 being very much degraded.

The comparison between example 10 and comparative examples 3 and 4, show the advantageous effects of the presence of the layer made from an oxide other than silicon oxide in the upper dielectric coating, between the barrier layer and the silicon nitride layer: much better resistance to Neutral Salt Spray and much lower change in light and energy transmission due to heat treatment.

The invention claimed is:

1. A glazing, comprising:
a transparent substrate provided with a stack of layers, the stack of layers comprising:
an alternating arrangement of n infrared radiation reflecting functional layers and n+1 dielectric coatings, with n>1, such that each functional layer is surrounded by the dielectric coatings, and
a primary barrier layer above and in direct contact with a functional layer furthest away from the substrate;
wherein:
a dielectric coating closest to the substrate comprises a layer made from an oxide where the oxide layer is not made from a nitride or an oxynitride and the oxide layer is in direct contact with the substrate,
at least one of the dielectric coatings is internal and is surrounded by two functional layers and each internal dielectric coating comprises:
a plurality of layers made from an oxide other than silicon oxide, each layer made from an oxide other than silicon oxide having a thickness of greater than 5 nm, and
a layer made from a silicon nitride or a silicon oxide and having a thickness of greater than 5 nm that is surrounded, on both sides, by the plurality of layers made from an oxide other than silicon oxide,
the primary barrier layer comprises zinc oxide or comprises an indium oxide optionally doped with tin, and
a dielectric coating furthest away from the substrate comprises, in an order starting from the substrate:
a layer made from an oxide other than silicon oxide and having a thickness of greater than 3 nm, and
a layer made from a silicon nitride or a silicon oxide and having a thickness of greater than 10 nm, and
the primary barrier layer and the layer made from an oxide other than silicon oxide within the dielectric coating furthest from the substrate are made of different materials.

2. The glazing according to claim 1, wherein the layer made from an oxide and in direct contact with the substrate is a layer of zinc-tin mixed oxide.

3. The glazing according to claim 1, wherein the layer made from an oxide and in direct contact with the substrate has a thickness of at least 20 nm.

4. The glazing according to claim 1, wherein the plurality of layers made from an oxide other than silicon oxide are made from zinc-tin mixed oxide.

5. The glazing according to claim 1, wherein at least one of the dielectric coatings has a functional layer superposed thereon and each dielectric coating having a functional layer superposed thereon comprises a zinc oxide-based layer that is directly under and in contact with the functional layer.

6. The glazing according to claim 5, wherein the zinc oxide-based layer has a thickness of no greater than 15 nm.

7. The glazing according to claim 1, wherein the stack of layers further comprises a plurality of secondary barrier layers made from a zinc oxide optionally doped with aluminium or an indium oxide optionally doped with tin, each secondary barrier layer being above and in direct contact with a functional layer.

8. The glazing according to claim 7, wherein the primary barrier layer and the secondary barrier layers each have a thickness of no greater than 20 nm.

9. The glazing according to claim 7, wherein the stack of layers comprises, in an order starting from the substrate:
a layer of zinc-tin mixed oxide having a thickness of 20 nm to 40 nm,
a first layer of zinc oxide having of 3 nm to 10 nm and is optionally doped,
a functional layer that is silver-based and having a thickness of 9 nm to 17 nm,
a secondary barrier layer of zinc oxide having a thickness of 2 nm to 16 nm and is optionally doped with aluminum,
optionally, a layer of zinc oxide comprising a secondary metal at a Zn/secondary metal weight ratio of at least 80/20,
a layer of zinc-tin mixed oxide having a thickness of 10 nm to 50 nm,
a layer of silicon nitride having a thickness of 10 nm to 50 nm,
a layer of zinc-tin mixed oxide having a thickness of 5 nm to 50 nm,
a second layer of zinc oxide having a thickness of 3 nm to 10 nm and is optionally doped, a functional layer that is silver-based and having a thickness of 10 nm to 20 nm, a secondary barrier layer of zinc oxide having a thickness of 2 nm to 16 nm and is optionally doped with aluminum, optionally, a second layer of zinc oxide comprising a secondary metal at a Zn/metal weight ratio of at least 80/20, a layer of zinc-tin mixed oxide having a thickness of 3 nm to 20 nm, a layer of silicon nitride having a thickness of 10 nm to 35 nm, and optionally, a layer of titanium-zirconium mixed oxide having a thickness of 3 nm to 10 nm.

10. The glazing according to claim 1, wherein the dielectric coating furthest away from the substrate further comprises a protective topcoat forming a last layer of the stack of layers, the protective topcoat comprising an oxide that is optionally a substoichiometric oxide of Ti, Zr, or both.

11. The glazing according to claim 10, wherein the protective topcoat has a thickness of no greater than 15 nm.

12. The glazing according to claim 1, wherein at least one of the dielectric coatings comprises a dielectric material having a refractive index of higher than 2.2.

13. The glazing according to claim 12, wherein the dielectric material is an oxide of at least one element selected from the group consisting of Ti, Nb and Zr.

14. The glazing according to claim 12, wherein each internal dielectric coating comprises, in an order starting from the substrate:

optionally, a layer of zinc oxide comprising a secondary metal at a Zn/secondary metal weight ratio of at least 80/20, a first layer of zinc-tin mixed oxide having a thickness of 10 nm to 30 nm, a layer of silicon nitride having a thickness of 10 nm to 45 nm, a second layer of zinc-tin mixed oxide having a thickness of 10 nm to 30 nm, a layer of zinc oxide having a thickness of 3 nm to 10 nm, and a layer of titanium-zirconium mixed oxide having a thickness of 2 nm to 30 nm, the layer of titanium-zirconium mixed oxide being between the first layer of zinc-tin mixed oxide and the layer of silicon nitride or between the layer of silicon nitride and the second layer of zinc-tin mixed oxide; or two layers of titanium-zirconium mixed oxide having a thickness of 2 nm to 30 nm, one of the two layers of titanium-zirconium mixed oxide being between the first layer of zinc-tin mixed oxide and the layer of silicon nitride and the other of the two layers of titanium-zirconium mixed oxide being between the layer of silicon nitride and the second layer of zinc-tin mixed oxide.

15. The glazing according to claim 1, wherein the plurality of layers made from an oxide other than silicon oxide are made from titanium-zirconium mixed oxide.

16. The glazing according to claim 1, showing a variation in color both in transmission and in reflection between the glazing that has not been heat treated and the heat treated glazing, as defined by a ΔE* in a single glazing, of no greater than 8.

17. The glazing according to claim 1, showing a variation in light and energy transmission and reflection between the glazing that has not been heat treated and the heat treated glazing, in a single glazing, of no greater than 5.

18. A glazing, comprising:
a transparent substrate provided with a stack of layers, the stack of layers comprising:
an alternating arrangement of n infrared radiation reflecting functional layers and n+1 dielectric coatings, with n>1, such that each functional layer is surrounded by the dielectric coatings, and
a primary barrier layer above and in direct contact with the functional layer furthest away from the substrate;
wherein:
a dielectric coating closest to the substrate comprises an oxide layer and the oxide layer is in direct contact with the substrate,
at least one of the dielectric coatings is internal and is surrounded by two functional layers and each internal dielectric coating comprises:
a plurality of titanium-zirconium mixed oxide layers, each titanium-zirconium mixed oxide layer having a thickness of greater than 5 nm, and
a layer made from a silicon nitride or a silicon oxide and having a thickness of greater than 5 nm that is surrounded, on both sides, by the plurality of titanium-zirconium mixed oxide layers,
the primary barrier layer comprises zinc oxide or comprises an indium oxide optionally doped with tin, and
a dielectric coating furthest away from the substrate comprises, in an order starting from the substrate:
a layer made from an oxide other than silicon oxide and having a thickness of greater than 3 nm, and
a layer made from a silicon nitride or a silicon oxide and having a thickness of greater than 10 nm.

19. The glazing according to claim 18, wherein the oxide layer in direct contact with the substrate is a layer of zinc-tin mixed oxide.

20. A glazing, comprising a transparent substrate provided with a stack of layers, the stack of layers comprising:
a dielectric coating closest to the substrate further comprising an oxide layer in direct contact with the substrate, the oxide layer in direct contact with the substrate comprising a zinc-tin mixed oxide;
at least two functional layers;
at least one internal dielectric coating surrounded by two functional layers, each internal dielectric coating further comprising:
a plurality of layers made from an oxide other than silicon oxide, each layer made from an oxide other than silicon oxide having a thickness of greater than 5 nm, and
a layer made from a silicon nitride or a silicon oxide and having a thickness of greater than 5 nm that is surrounded, on both sides, by the plurality of layers made from an oxide other than silicon oxide;
a primary barrier layer above and in direct contact with a functional layer furthest away from the substrate, the primary barrier layer comprising zinc oxide or indium oxide optionally doped with tin; and
a dielectric coating furthest away from the substrate comprising, in an order starting from the substrate:
a layer made from an oxide other than silicon oxide and having a thickness of greater than 3 nm, and
a layer made from a silicon nitride or a silicon oxide and having a thickness of greater than 10 nm.

* * * * *

UNITED STATES PATENT AND TRADEMARK OFFICE
CERTIFICATE OF CORRECTION

PATENT NO. : 9,896,377 B2  
APPLICATION NO. : 14/894466  
DATED : February 20, 2018  
INVENTOR(S) : Stijn Mahieu et al.

Page 1 of 1

It is certified that error appears in the above-identified patent and that said Letters Patent is hereby corrected as shown below:

On the Title Page

Item (73), the Assignee's information is incorrect. Item (73) should read:
--(73) Assignee: AGC GLASS EUROPE, Louvain-La-Neuve (BE)--

Signed and Sealed this
Nineteenth Day of March, 2019

Andrei Iancu
*Director of the United States Patent and Trademark Office*